I. A. REASONER AND D. J. FLINTJER.
PNEUMATIC TIRE.
APPLICATION FILED MAY 22, 1919.
1,419,470.
Patented June 13, 1922.
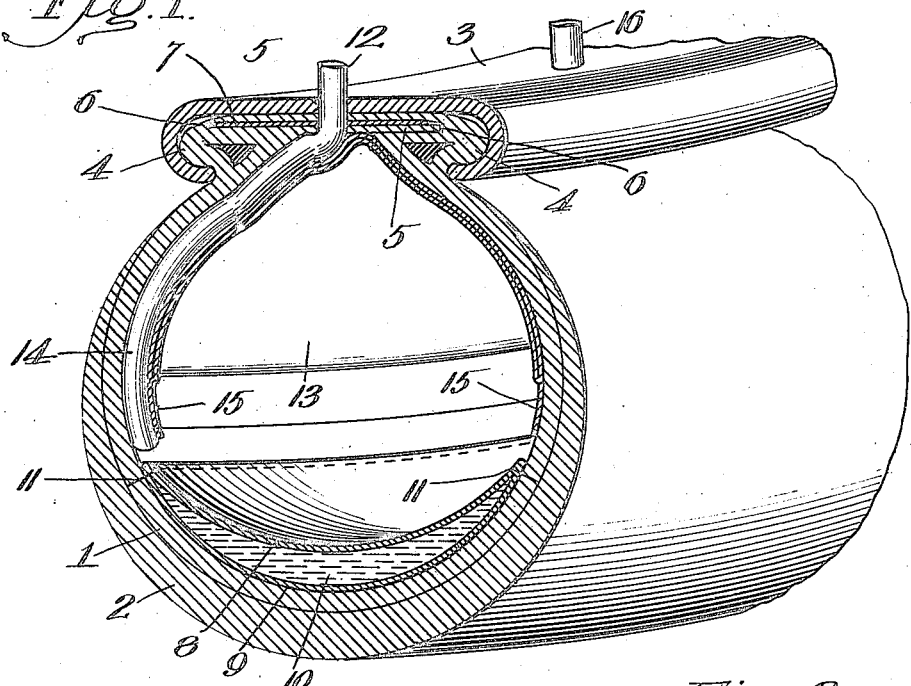
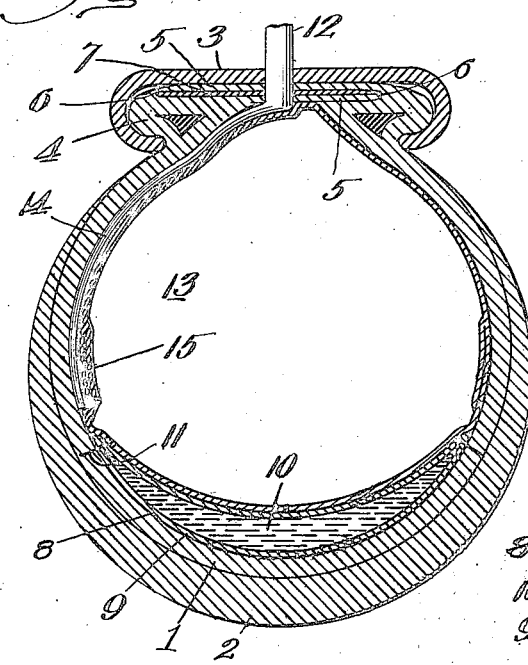
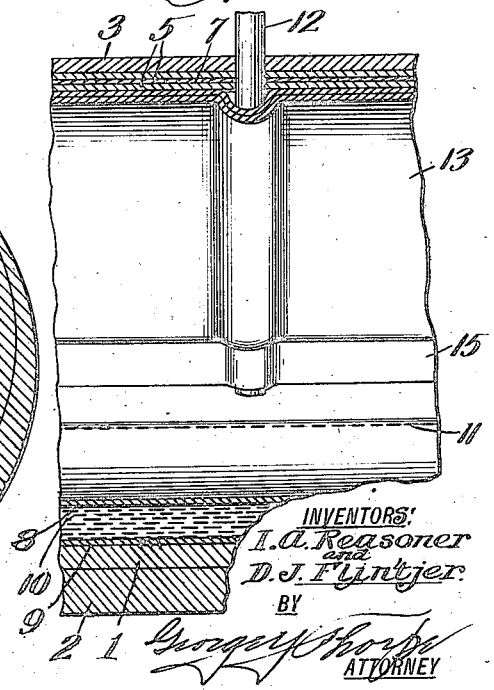
INVENTORS:
I. A. Reasoner
and
D. J. Flintjer
BY
George Thorpe
ATTORNEY

UNITED STATES PATENT OFFICE.

ISAAC A. REASONER AND DANIEL J. FLINTJER, OF WINONA, MISSOURI.

PNEUMATIC TIRE.

1,419,470.     Specification of Letters Patent.     Patented June 13, 1922.

Application filed May 22, 1919. Serial No. 299,015.

*To all whom it may concern:*

Be it known that we, ISAAC A. REASONER and DANIEL J. FLINTJER, citizens of the United States, residing at Winona, in the county of Shannon and State of Missouri, have invented certain new and useful Improvements in Pneumatic Tires, of which the following is a specification.

This invention relates to pneumatic tires and more especially to tires of that class provided with puncture sealing means, and our primary object is to produce a tire susceptible of use with or without an inner tube, and capable of retaining inflating air. Another object is to produce a tire provided internally on its tread or peripheral portion with a hollow flexible ring containing plastic cement for instantly sealing punctures in the tread of the tire and said ring and thereby preventing deflation of the tire. A still further object is to produce a tire casing of material much stronger and more durable than the material or tire fabric heretofore used.

With these objects in view the invention consists in certain novel and useful features of construction and combinations of parts as hereinafter described and claimed; and in order that it may be fully understood reference is to be had to the accompanying drawing, in which:

Figure 1, is a sectional perspective view of a pneumatic tire embodying the invention, the same showing an inner tube in unused or deflated condition.

Figure 2, is a cross section showing the inner tube in used or inflated condition.

Figure 3, is a broken fragmentary central vertical section of the tire as disclosed by Figure 1.

In carrying the invention into effect, an ordinary casing supplemented as hereinafter explained, may be employed, but it is preferable to build same of an inner member 1 of one or more layers of fabric composed of tightly woven sisal, as such material possesses greater strength and resistance to penetration than the tire fabric commonly employed, and an outer layer 2 of rubber, and to produce a tire of the greatest strength it is desirable that the rubber shall be molded on the fabric so that the casing shall chiefly flex nearer the rim 3, than do casings where the margins of the heavy or thick part of the rubber become flush with the thin part of the rubber in the ordinary casing.

If the casing is for use with a clincher rim, as shown, it will be provided with the usual beads 4, and at its margins will be formed into overlapping flaps 5, one abutting at its free edge against a shoulder 6 on the other, to limit the amount of overlap and hence lateral slippage or creepage of the flaps in one direction, the rim engaging the beads limiting creepage in the reverse direction, and to cause said flaps to adhere with an air-tight relation, a strip 7 of plastic cement is fitted between the flaps, it being understood that this cement is what is known to the trade as a self-healing compound of such character that the flaps can be separated without injury in the event of necessity. The cement is a stock product and can be purchased in the open market.

Fitted in the casing against the tread portion thereof, is a hollow flexible ring, the inner wall 8 being preferably narrower than the outer wall 9 so that when the tire is inflated, the ring shall form a crescent-shaped chamber. Said chamber is charged with a cement 10 of pasty constituency so that it shall be capable of immediately sealing a puncture produced in the ring and hence prevent deflation of the tire by leakage through such puncture and the tire. The ring can be charged with the cement in any suitable manner, before it is inserted in the tire and secured thereto by stitching 11 or in any other suitable manner, it being necessary to secure it in some manner to prevent slippage or creepage.

To inflate the tire an ordinary valve-tube 12 will be used, the same being secured in the customary manner, through an opening in the rim and through the flaps 5 and the interposed cement 7, the latter making the joint with the tube perfectly air-tight. If the tire is equipped with an inner tube 13, the tube 12 will be provided with a collapsible extension 14 extending along one wall of the casing exterior to tube 13, so that when air is forced into the casing, the tube 13 may collapse as indicated, and in such condition performs no material function. Of course the inner tube may be omitted entirely when a casing of the type described, is employed.

For the greatest security against leakage of air, it is desirable to employ the inner tube, and it is also desirable to avoid fouling the tube 12 to provide the inner tube with external flaps 15 and cement same to the inner face of the casing at opposite sides thereof, one of such flaps and the inner tube circling around the tube 14 to avoid throttling or compressing the same to such extent as to prevent the passage of air therethrough, it being noted also that the discharge end of the tube 14 projects beyond the encircling flap 15, so that the air is free to enter the casing and double back or collapse the outer part of the said inner tube against the inner part, as shown in Figures 1 and 3. The inner tube will be provided with its usual valve tube 16, and when inflated will assume the position shown by Figure 2, where it will be noticed, the tube 14 is flattened or collapsed against the wall of the casing.

From the foregoing it will be seen that we have produced a pneumatic tire possessing the features of advantage set forth as desirable in the statement of the object of the invention, and which is susceptible of change in minor particulars without departing from the principle of construction involved.

We claim:

A pneumatic tire comprising a casing having marginal flaps to overlap at the inner side, a strip of plastic cement for interposition between said flaps to seal the joint between them, and a tube extending through said flaps and the interposed strip of cement and having an air-tight connection with the latter.

In testimony whereof we affix our signatures.

ISAAC A. REASONER.
DANIEL J. FLINTJER.